United States Patent
Cloarec

(10) Patent No.: US 8,118,540 B2
(45) Date of Patent: Feb. 21, 2012

(54) SPLIT RING FOR A ROTARY PART OF A TURBOMACHINE

(75) Inventor: Yvon Cloarec, Ecuelles (FR)

(73) Assignee: SNECMA, Paris (FR)

( * ) Notice: Subject to any disclaimer, the term of this patent is extended or adjusted under 35 U.S.C. 154(b) by 609 days.

(21) Appl. No.: 12/363,014

(22) Filed: Jan. 30, 2009

(65) Prior Publication Data

US 2009/0214347 A1  Aug. 27, 2009

(30) Foreign Application Priority Data

Feb. 27, 2008 (FR) .................................. 08 01067

(51) Int. Cl.
*F01D 5/30* (2006.01)

(52) U.S. Cl. ........................ 415/119; 416/500

(58) Field of Classification Search .................. 416/500, 416/144, 145, 221, 218, 190, 220 R, 191, 416/194, 195; 415/119

See application file for complete search history.

(56) References Cited

U.S. PATENT DOCUMENTS

| 3,837,179 | A | * | 9/1974 | Barth | 464/76 |
| 4,653,721 | A | * | 3/1987 | Bachmann et al. | 251/88 |
| 5,040,905 | A | * | 8/1991 | Boyd | 384/130 |
| 5,054,523 | A | * | 10/1991 | Rink | 137/377 |
| 5,655,632 | A | * | 8/1997 | Valembois | 188/136 |

FOREIGN PATENT DOCUMENTS

| FR | 1.020.209 | 2/1953 |
| FR | 2 674 299 | 9/1992 |
| FR | 2 888 876 | 1/2007 |
| FR | 2 888 877 | 1/2007 |

\* cited by examiner

*Primary Examiner* — Gary F. Paumen
(74) *Attorney, Agent, or Firm* — Oblon, Spivak, McClelland, Maier & Neustadt, L.L.P.

(57) ABSTRACT

A split ring for mounting with elastic prestress in an annular groove of a rotary part of a turbomachine and having, in the free state, a diameter that is greater than the diameter of the groove, is remarkable in that, in the free state and without stress, the end portions of the ring are circular arcs having a radius of curvature that is substantially equal to the radius of curvature of the annular groove.

9 Claims, 2 Drawing Sheets

SPLIT RING FOR A ROTARY PART OF A TURBOMACHINE

FIELD OF THE INVENTION

The present invention relates to a ring for mounting on a turbomachine rotor element and that is subjected to a centrifugal force field in operation, the ring serving for example to retain a member, to damp vibration, or to provide sealing.

BACKGROUND OF THE INVENTION

By way of example, it is known to damp the vibration of a turbomachine rotor element by means of a metal split ring mounted with elastic stress in an annular groove of a rotor element, the opening of the groove facing towards the axis of rotation of the rotor. The split ring in the free state without stress presents an outer diameter greater than the diameter of the bottom of the groove, and it is tightened up in order to reduce its radius of curvature so as to enable it to be mounted in the groove and exert pressure on the bottom thereof.

The operation of the turbomachine gives rise to micro-movements and rubbing between the ring and the annular groove in the rotor, thereby dissipating energy and at least partially damping the vibratory phenomena and the instabilities that give rise to the micro-movements and the rubbing of the ring. Nevertheless, the elastic deformation of the ring in the groove is not uniform over its entire circumferential extent, which gives rise to bending that is substantially zero at the ends of the ring and that increases towards the portion of the ring that is diametrically opposite to split. Thus, when the ring is mounted in the annular groove, the lack of bending of its end portions does not enable them to make contact with the bottom of the annular groove since the outer radius of curvature of these end portions remains greater than the radius of curvature of the bottom of the groove, so it is only the ends of the ring that come to bear against the bottom of the groove, which can lead to local wear of the portion of the groove that is in contact with the ends of the ring.

When the turbomachine is in operation, the air or the gas used for combustion and thrust can flow between the stationary parts and the rotary parts and can escape towards the inside of the turbomachine so as to pass between the bottom of the annular groove and the end portions of the ring that are not in contact therewith. Solid particles conveyed by the air or by the gas can thus become lodged between the end portions of the ring and the bottom of the groove.

During rotation of the rotor, the end portions of the ring are pressed against the bottom of the annular groove by centrifugal forces. These forces are not strong enough to destroy the solid particles that have become interposed between the bottom of the groove and the ring, but they press said particles against the bottom of the groove with relatively high pressure, thereby leading to damage to the ring and/or to the rotor, and limiting the lifetime of these parts.

OBJECT AND BRIEF SUMMARY OF THE INVENTION

A particular object of the invention is to provide a solution to this problem that is simple, effective, and inexpensive.

To this end, the invention provides a split ring for a rotary part of a turbomachine, the ring being designed to be mounted with elastic prestress in an annular groove of the rotary part, which groove is open towards the axis of rotation, and the ring, in the free state, presenting a diameter that is greater than that of the groove, wherein in the free state and without stress, the end portions of the ring are circular arcs having a radius of curvature that is substantially equal to the radius of curvature of the annular groove.

Since the deformation of the ring is not distributed uniformly around the ring and is practically zero at the end portions of the ring, making these end portions with a radius of curvature that is substantially equal to the radius of curvature of the annular groove makes it possible to ensure close contact between said end portions and the bottom of the annular groove. Thus, since this contact is achieved on assembly, air and gas flowing inside the turbomachine can no longer pass between the ring and the bottom of the groove, so no solid particles can become deposited therein, thereby avoiding damage to the rotary part and/or to the ring.

Advantageously, the end portions in the free state present an outer radius of curvature that is equal to the radius of curvature of the bottom of the annular groove.

According to another characteristic of the invention, the outer radius of curvature of the end portions in the free state is slightly less than the radius of the bottom of the groove, thus making it possible at rest to ensure contact between the major portion of the ring and the bottom of the groove, with the ends of the ring coming into contact with the bottom of the groove under the effect of centrifugal forces when the turbomachine is in operation.

The angular extent of the circularly arcuate end portions of the ring depends on the stiffness of the ring and on the diameter of the annular groove in which it is to be inserted.

In a practical application of the invention, each of the end portions of the ring has an angular extent of less than 40°, which annular extent preferably lies in the range 20° to 30°.

According to another aspect of the invention, the end portions are connected to circularly arcuate portions of radius of curvature greater than the radius of curvature of the bottom of the annular groove.

The deformation of the ring during assembly is at its maximum in the portions of the ring that are far away from the split, so it is preferable for these portions in the free state to retain a radius of curvature that is greater than the radius of curvature of the bottom of the annular groove.

The invention also provides a rotor, in particular for a turbomachine, the rotor including at least one disk carrying at its periphery a plurality of blades, and at least one split ring of the above-described type, received in an annular groove of the disk.

The invention may also be applied to a rotary part of a turbomachine, the part including an annular groove having a split rings as described above mounted therein.

The invention also provides a turbomachine such as an airplane turbojet or turboprop, which turbomachine includes split ring as described above.

BRIEF DESCRIPTION OF THE DRAWINGS

The invention can be better understood and other details, advantages, and characteristics of the invention appear on reading the following description made by way of non-limiting example and with reference to the accompanying drawings, in which.

MORE DETAILED DESCRIPTION

Figure 1:
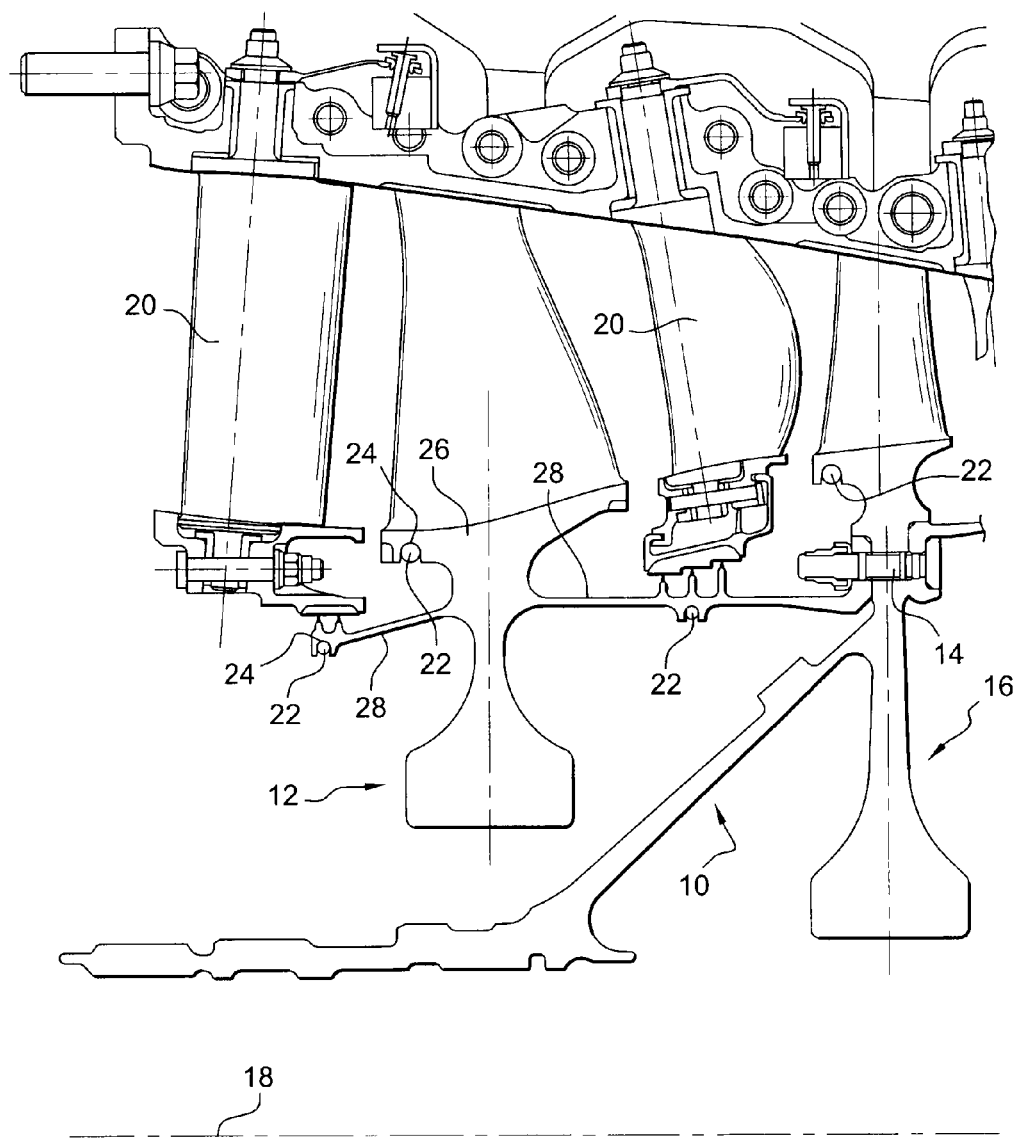
FIG. 1 is a fragmentary diagrammatic view in axial section of a turbomachine rotor fitted with vibration-damper rings.

FIG. 1 shows a portion of a high-pressure compressor of a turbojet, the compressor comprising a rotor 10 with a one-piece bladed disk 12 secured by bolts 14 to another one-piece bladed disk 16 driven in rotation by a shaft (not shown) of axis 18, the high-pressure compressor also comprising stages of stationary nozzle vanes 20 disposed in alternation with the rotor disks 12 and 16, the rotor disks being fitted with vibration damper rings 22 that are mounted in annular grooves 24 formed in the platforms 26 of the disks 12, 16 and in cylindrical walls 28 secured to the disks.

The rings 22 are split, and in the free state each of them presents a radius greater than the mean radius of the bottom of the annular groove 24 in which it is to be inserted. Prior to being mounted in a groove 24, elastic stress is applied to the ring 22 in order to close it up and reduce its radius for the purpose of inserting it in the groove 24. When in place in the groove, the ring 22 relaxes and bears against the bottom of the annular groove 24.

Figure 2:
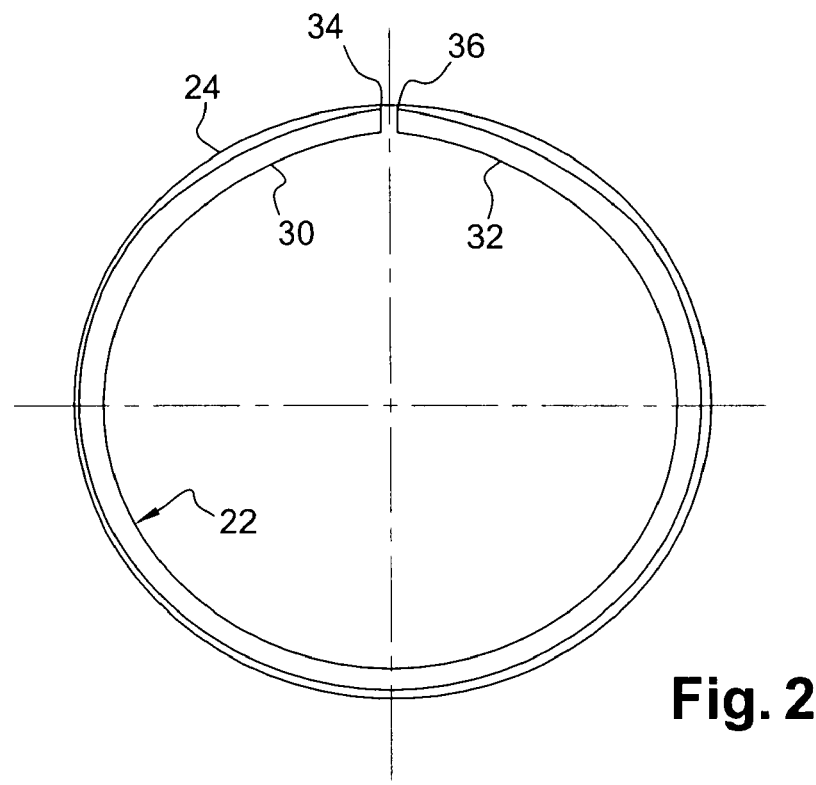
FIG. 2 is a diagrammatic axial section view of a split ring mounted in an annular groove in accordance with the prior art.

Nevertheless, it is found that deformation of the ring 22 in the groove 24 is not circumferentially uniform, and is practically nil in the vicinity of the end portions 30 and 32 of the ring 22 (FIG. 2). The radius of curvature of the end portions 30 and 32 remains greater than that of the bottom of the annular groove 24, which prevents contact being ensured between the end portions 30 and 32 and the bottom of the annular groove 24. Only the ends 34 and 36 of the ring 22 bear against the bottom of the annular groove 24 while the end portions 30 and 32 of the ring 22 behave like quasi-rectilinear beams, leaving gaps between themselves and the bottom of the groove 24, in which gaps solid particles conveyed by the air can become deposited. In operation, these solid particles are compressed between the ring 22 and the bottom of the groove 24 by centrifugal forces and they form relatively deep indentations therein.

In operation, vibration and instabilities in the rotation of the rotor give rise to micro-movements of the ring 22 in the groove 24 that have the effect of causing the ring 22 and the bottom of the groove 24 to be degraded and worn away relatively quickly.

Figure 3:
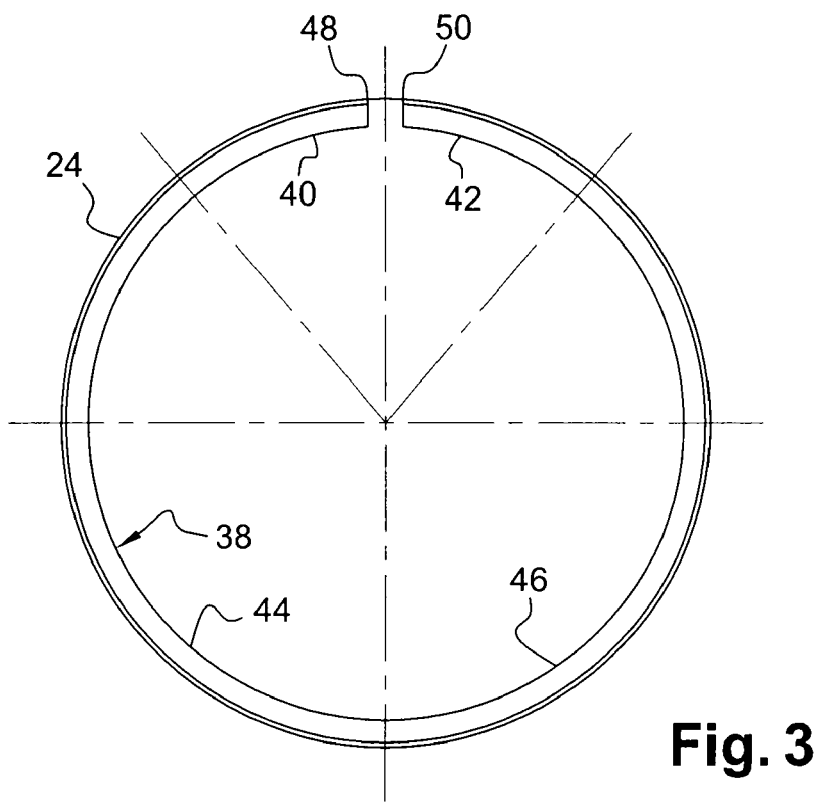
FIG. 3 is a diagrammatic axial section view of a split ring of the invention mounted in an annular groove.

The use of a ring 38 having end portions 40 and 42 that, in the free state, constitute circular arcs having an outer radius of curvature substantially equal to the radius of curvature of the annular groove 24 makes it possible during insertion of the ring 38 to guarantee contact between the end portions 40 and 42 and the bottom of the groove 24 and to avoid solid particles becoming deposited between the ring 38 and the bottom of the annular groove 24 (FIG. 3).

The end portions 40 and 42 of the ring 38 are connected to circularly arcuate portions 44, 46 that, in the free state, present a radius of curvature that is greater than that of the groove 24.

During assembly, maximum stress is applied to the circularly arcuate portions 44 and 46 so that their radius of curvature decreases sufficiently to enable the ring 38 to be inserted in the annular groove 24. The effect of the ring 38 relaxing elastically in the groove 24 is to press the circularly arcuate portions 44 and 46 against the bottom of the groove 24. The end portions 40 and 42 connected to the circularly arcuate portions 44 and 46 are put into continuous contact with the bottom of the groove 24 because their own radius of curvature is substantially equal to that of the bottom of the annular groove 24.

Advantageously, the end portions 40 and 42 present, in the free state, an outer radius of curvature that is exactly equal to the radius of curvature of the bottom of the annular groove 24 so as to guarantee good contact between the end portions 40 and 42 and the bottom of the groove 24.

In a variant, in the free state, the outer radius of curvature of the end portions 40 and 42 may be slightly smaller than that of the bottom of the groove 24. Under such circumstances, during assembly of the ring 38 in the annular groove 24, the end portions 40 and 42 come into contact with the bottom of the annular groove 24. In operation, the ends 48, 50 of the ring 38 come into contact with the bottom of the annular groove 24 once centrifugal force is sufficient to press the ends 48, 50 against the bottom of the groove 24. In this configuration, the end portions 40 and 42 are brought fully into contact with the bottom of the annular groove 24 once the turbomachine starts to operate, thereby achieving the same result as in the above embodiment.

The angular extent of the circularly arcuate end portions of the ring depends on the stiffness of the ring and on the diameter of the annular groove in which the ring is to be inserted. In a practical application of the invention, the end portions 40 and 42 have an angular extent of less than 40°, and preferably lying in the range 20° to 30°.

The invention is not limited to damper rings, and the above-described ring could equally well be used for providing sealing between different parts of the turbomachine or for retaining members on rotary parts, such as in particular gearwheels, bearing elements, etc.

What is claimed is:

1. A split ring for a rotary part of a turbomachine, the ring being designed to be mounted with elastic prestress in an annular groove of the rotary part, which groove is open towards the axis of rotation, and the ring, in the free state, presenting a diameter that is greater than that of the groove, wherein in the free state and without stress, the end portions of the ring are circular arcs having a radius of curvature that is substantially equal to the radius of curvature of the annular groove.

2. A ring according to claim 1, wherein the end portions in the free state present an outer radius of curvature that is equal to the radius of curvature of the bottom of the annular groove.

3. A ring according to claim 1, wherein the outer radius of curvature of the end portions in the free state is less than the radius of the bottom of the groove.

4. A ring according to claim 1, wherein each end portion presents an angular extent of less than 40°.

5. A ring according to claim 1, wherein each end portion presents an annular extent lying in the range 20° to 30°.

6. A ring according to claim 1, wherein the end portions are connected to circularly arcuate portions of radius of curvature greater than the radius of curvature of the bottom of the annular groove.

7. A rotor, in particular for a turbomachine, the rotor including at least one disk carrying at its periphery a plurality of blades, and at least one split ring according to claim 1, received in an annular groove of the disk.

8. A rotary part for a turbomachine, wherein the part includes an annular groove having a split ring according to claim 1 mounted therein.

9. A turbomachine such as an airplane turbojet or turboprop, wherein the turbomachine includes rings according to claim 1.

* * * * *